(12) United States Patent
Hed et al.

(10) Patent No.: US 9,597,926 B1
(45) Date of Patent: Mar. 21, 2017

(54) BICYCLE RIM FOR TUBELESS TIRE

(71) Applicant: Hed Cycling Products, Inc., Shoreview, MN (US)

(72) Inventors: Steven Arthur Hed, North Oaks, MN (US); Christopher Andrew Edin, Mahtomedi, MN (US)

(73) Assignee: Hed Cycling Products, Inc., Shoreview, MN (US)

( * ) Notice: Subject to any disclaimer, the term of this patent is extended or adjusted under 35 U.S.C. 154(b) by 0 days.

(21) Appl. No.: 14/485,224

(22) Filed: Sep. 12, 2014

Related U.S. Application Data

(60) Provisional application No. 61/900,833, filed on Nov. 6, 2013, provisional application No. 61/880,052, filed on Sep. 19, 2013.

(51) Int. Cl.
  *B60B 21/02*  (2006.01)
  *B60B 21/10*  (2006.01)

(52) U.S. Cl.
  CPC .......... *B60B 21/102* (2013.01); *B60B 21/026* (2013.01); *B60B 2900/351* (2013.01); *B60B 2900/523* (2013.01)

(58) Field of Classification Search
  CPC ....... B60B 21/00; B60B 21/02; B60B 21/026; B60B 21/028; B60B 21/068; B60B 21/102; B60B 21/104; B60B 21/106; B60B 21/108; B60B 2900/5116; B60B 2900/521; B60B 2900/523
  See application file for complete search history.

(56) References Cited

U.S. PATENT DOCUMENTS

| | | | | |
|---|---|---|---|---|
| 841,801 | A * | 1/1907 | Midgley | B60B 21/02 301/30 |
| 1,757,728 | A * | 5/1930 | Martin | B60B 21/02 152/381.3 |
| 2,127,052 | A * | 8/1938 | Von Bon Horst | B60B 21/00 152/153 |
| 2,844,180 | A * | 7/1958 | Omeron | B60C 17/04 152/158 |
| 2,977,153 | A * | 3/1961 | Mueller | B21D 53/30 301/95.107 |
| 5,988,764 | A * | 11/1999 | Deetz | B60B 21/04 152/381.3 |
| 6,752,187 | B1 | 6/2004 | Tien | |
| 7,334,846 | B2 * | 2/2008 | Koziatek | B60B 21/025 152/382 |
| 7,431,403 | B1 * | 10/2008 | Chen | B60B 1/041 301/95.101 |

* cited by examiner

*Primary Examiner* — Frank Vanaman
(74) *Attorney, Agent, or Firm* — Sprinkle IP Law Group

(57) ABSTRACT

Bicycle rims that allow tires to be more easily mounted in a tubeless configuration are disclosed. More specifically, a bicycle rim may control the two beads of the tire with separate bead channels for each bead and a center bridge extending between the two bead channels.

29 Claims, 10 Drawing Sheets

BICYCLE RIM FOR TUBELESS TIRE

CROSS-REFERENCE TO RELATED APPLICATIONS

This application claims the benefit of priority under 35 U.S.C. 119(e) to United States Provisional Patent Application 61/880,052 filed Sep. 19, 2013, entitled "Bicycle Rim For Tubeless Tire" by Christopher Andrew Edin and Steven Arthur Hed, and U.S. Provisional Patent Application No. 61/900,833 filed Nov. 6, 2013, entitled "Bicycle Rim For Tubeless Tire" by Steven Arthur Hed, both of which are hereby fully incorporated by reference herein.

TECHNICAL FIELD

This disclosure relates generally to bicycle wheel rims. Specifically, this disclosure also relates to bicycle wheel rims shaped to allow a tire to be mounted and utilized in a tubeless configuration. More particularly, this disclosure also relates to bicycle wheel rims shaped to allow larger width tires to be mounted and utilized in a tubeless configuration.

BACKGROUND

Standard tires with tubes have certain advantages. For example, tires with tubes are easier to repair as all that is required is the replacement of a punctured tube; may have the ability to maintain pressure for long periods and usually do not require special adaptation of the rim for sealing. However, utilizing tires with tubes has a number of disadvantages as well. One disadvantage is that such tires may suffer from "pinch flats" in which the tube becomes momentarily pinched between the tire casing and the rim, tearing the tube. This problem is particularly acute for mountain bikes which tend to run tires at lower pressure and over rougher terrain. Another disadvantage is their weight. Tubeless bicycle tires do not suffer pinch flats and can be lighter because of the absence of the tube itself, however, the tubeless arrangement requires a sealed rim, a bead to rim seal and an air impermeable tire. Thus, the configuration of tubeless tires has proved problematic in certain applications.

One example of such an application is when a tubeless tire is used on a bicycle that takes wider tires. This type of bicycle is commonly referred to as a "fat bike". The tire size for these bikes is normally three to five inches wide. Correspondingly, the wheel rims (or just "rims") used for this size tire tend to be between 50 mm to 100 mm wide (and in many cases between 65 mm and 85 mm), and the diameter is mostly the 26 inch designation but there are also 29 inch fat bikes and in the future the expectation is that there will be even more sizes such as 27.5 inch.

In a conventional tubeless tire setup for bicycles, there is a center channel in the rim that the tire beads rest in an uninflated state. During inflation of the tire when a sufficient pressure is reached within the tire bead travels (or "pops") onto a shelf formed in the rim thereby sealing the system, holding the tire in place and allowing it to retain a desired pressure. These conventional designs are, however, inadequate for tires of larger width or in certain cases when trying to inflate the tire with a manual air pump. In the main, this is the case because as the width of the rim and the tire increases, the area between the beads of the tire as it rests on the center channel commensurately increases.

Having a center channel that holds the beads, but that is also sufficiently tight to allow a sufficient pressure to be established such that the tubeless tire "pops" onto the rim ledges is difficult In part, this is because there is a significant variation in the actual diameter of tires from different manufacturers. For example, a 26 inch tire from one manufacturer may be several millimeters larger than a 26 inch tire from another manufacturer. Moreover, there can be significant diameter differences within a single tire due to manufacturing tolerances (e.g., because the bead is warped). Therefore it can be difficult to produce a tubeless rim that works reliably.

Additionally, such a center channel may be problematic because if there is a deep well in the center of the rim it is difficult to get the beads to "behave" properly. Beads may flex or otherwise move in such a manner that creates a gap between at least one of the beads and the rim so that air escapes and a threshold pressure within the tire that would allow the tire to inflate in a "tubeless" manner (e.g., to get the beads to "pop" onto a retaining shelf) cannot be established. Such gaps are particularly likely to occur when the beads pop over a sharp transition to a retaining shelf.

To attempt to address some of these problems, certain tubeless rims have been designed for user with a particular bead size and shape. Rims of this type are, however, incompatible with any other type of tubeless tire that does adhere to such a bead size and shape.

What is desired then, is a bicycle wheel rim shaped to allow easier inflation of tires when used in a tubeless configuration and that may also be used with a wide variety of tires.

SUMMARY OF THE DISCLOSURE

To that end, embodiments of a bicycle rim that address the problem of making large sized mountain bike tires and other fat bike tires work in a tubeless way are disclosed herein. More specifically, embodiments described herein may control the two beads of the tire with separate bead channels for each bead. This provides easy installation of the tire onto the rim and allows the tire to inflate tubelessly. Holding the beads closely to the bead seat of the rim and controlling the bead seats properly allows for the beads to pop into place with less air volume. This is because less air is escaping from the system. Furthermore this solution allows the rim to be made of a single wall, and with or without chambers, which simplifies construction and manufacturing of the rim particularly when constructing the rim in carbon fiber.

Embodiments of such a bicycle rim adapted to seat both tubeless and tube tires may include an annular support portion forming a continuous ring. This support portion may have a tapered bead channel disposed to one side of a centerline of the support portion and another tapered bead channel disposed to the other side of the centerline. Both of these tapered channels may have the same bead channel diameter, which may, in one embodiment, be configured to be substantially the diameter of the beads of an appropriately sized tire in an uninflated state. Each of the bead channels may have a bead channel outer sidewall sloped such that a radially outer end of the bead channel outer sidewall is laterally outward of a radially inner end of the bead channel outer sidewall and a bead channel inner sidewall. The support portion may also include two bead seat portions disposed across the centerline and laterally outward of the bead channels. These bead seat portions may have a bead seat diameter that is greater than the bead channel diameter and be configured to accommodate the beads of an appropriately sized tire in an inflated state. The support portion may also include two rim ledges extending from a respective bead channel outer sidewall to a respective bead seat portion and a center bridge extending between the inner sidewalls of each bead channel bead. The diameter at a first lateral end and a second lateral end of the center bridge may be greater than the bead seat channel diameter, bead seat diameter and diameters of the first rim ledge and second rim ledge. The bicycle rim also includes rim sidewalls disposed across the centerline and extending radially outward from the support portion at each lateral end of the support portion.

Such a rim may, in certain embodiments, be created by affixing a separate annular rim strip to a bicycle rim. In particular, in some embodiments, a ring of material may be placed inside conventionally shaped tubeless rims. Such embodiments may be shaped to be press fit into the center channel or otherwise held in place such as by a zip tie or the like, to form a friction fitting with the one or more walls of the center channel of the conventionally shaped tubeless rim such that the combination of the tubeless rim and the ring form a rim shaped according to embodiments as disclosed herein.

Thus, in certain embodiments mounting a tire in a tubeless configuration on such a rim may comprise placing the rim between the beads of the tire beads, placing a tire bead in the one of the bead channels; placing the other tire bead in the other bead channel and inflating the tire so that the beads transition from the bead channels to the bead seats. To aid in the inflation of the tire, in certain embodiments, a mechanical seal may be placed either one of, or both, the bead channels prior to, or subsequently to, placing the tire beads in the bead channels. Such a mechanical seal may be, for example, an elastic rim, or rim tape which may be used in preparing the bicycle rim for the mounting of a tire (e.g., used for sealing spokes or the like).

Embodiments as disclosed herein may therefore provide a number of advantages. Namely, embodiments of a rim shaped accordingly may allow the use of wider tires in a tubeless configuration. The rims themselves may thus be made wider and the tires used may be wider and achieve a substantial weight reduction relative to operation of an equivalently sized tire in a configuration utilizing a tube. Additionally, as embodiments may be of a single wall and without chambers, ease of construction in various materials may be achieved.

Embodiments may also have the advantage of being able to accommodate for variations in tire sizes that exist between manufacturers and even for manufacturing variations within tires from the same manufacturer that are ostensibly of the same diameter. Additionally, they may also have the advantage of being able to accommodate beads of different shapes and sizes from different manufacturers and account for warping of these beads that occur, for example, during storage or transport of such tires.

For example, while tires from two different manufacturers may both be specified for use with a 29 inch rim, the tire from one manufacturer may fit "loosely" while the 29 inch tire from the second manufacturer may be "tight". In other words, there may be variations between the radial distances between the beads of two of the same sized tires between different manufacturers. Additionally, even different examples of the same tire coming from the same manufacturer may have different diameters because of, for example, manufacturing tolerances or the like. Certain embodiments as disclosed herein, at least because of the shape of the bead channels of these embodiments, may more easily accommodate the variations of tire diameter between manufacturers and tires and account for differentiation within the beads of any given tire itself (e.g., caused by warping of the bead) and therefore allow the use of a greater variety of tires in a tubeless configuration.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the disclosure. A clearer impression of the disclosure will become more readily apparent by referring to the exemplary, and therefore nonlimiting, embodiments illustrated in the drawings. Wherever possible, the same reference numbers will be used throughout the drawings to refer to the same or like features (elements). The drawings are not necessarily drawn to scale.

DETAILED DESCRIPTION

Figure 1A:
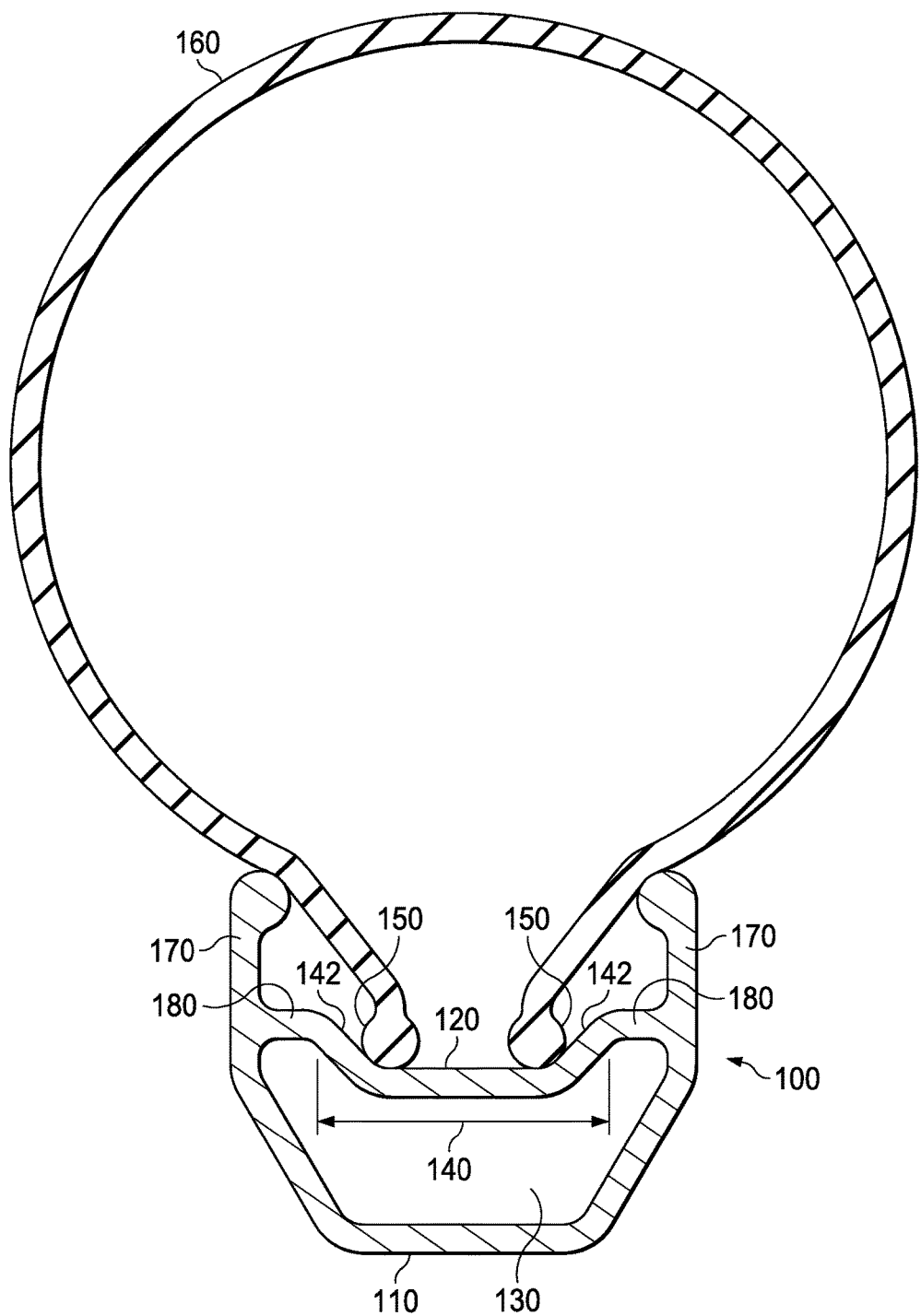
FIG. 1A illustrates a bicycle rim with a tire in a first state and FIG. 1B illustrates the bicycle rim with a tire in a second state.

Rims for tubeless tires and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying concept will become apparent to those skilled in the art from this disclosure.

Reference is now made in detail to the exemplary embodiments of the disclosure, examples of which are illustrated in the accompanying drawings. Wherever possible, like numerals will be used throughout the drawings to refer to like and corresponding parts (elements) of the various drawings. Any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only.

Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

For example, while embodiments of rims as disclosed herein will be discussed with respect to use of these rims with tires in a tubeless configuration, it will be noted that these embodiments may be utilized equally well in configurations that include a tube. Furthermore, while illustrative examples have been provided in conjunction with embodiments designed for use with fat bikes, embodiments may also be applied to non "fat bike" sized rim/tires and can be used for more conventional mountain bike as well as road bike rim/tire sizes. In the same vein, while specific measurements (e.g., widths, lengths, heights, radiuses, angles, etc.) have been given in conjunction with various embodiments it should be understood that these measurements are given by way of example and rims with other measurements are fully contemplated by the embodiments described herein.

As is well known in the art, a bicycle wheel (either a front or rear wheel) includes a rim connected to a central hub via a set of spokes or a disk. The spokes may be of a suitable type, straight or bent, and their arrangement can be either radial or crisscrossed. The rim may be made from a section or length of steel, light alloy, aluminum, carbon fiber or other material curved to form an annular support member and having two ends that are assembled together by welding or another fastening technique, so as to form a continuous ring by joining the two ends. In some case, the rim has openings for joining the spokes to the rim while in other cases the spokes may be formed integrally with the rim (e.g., as in a "mag" wheel).

The outer surface of the rim therefore comprises a surface upon which tires may be mounted. The shape of this mounting surface may significantly influence the ease of tire mounting or inflation. In particular, the height, shape and thickness of this mounting surface may contribute to overall rim weight, strength, tire stability, air leakage, and other considerations appreciated by those skilled in the art. Several issues to be considered with respect to the mounting surface thus include the ability to uniformly position the beads of a tire on the mounting surface prior to inflation, the ease of tire inflation (particularly, for example, with a manual pump), the interchangeable use of tubes and/or tubeless tires, and other considerations recognized in the art.

Figure 1B:
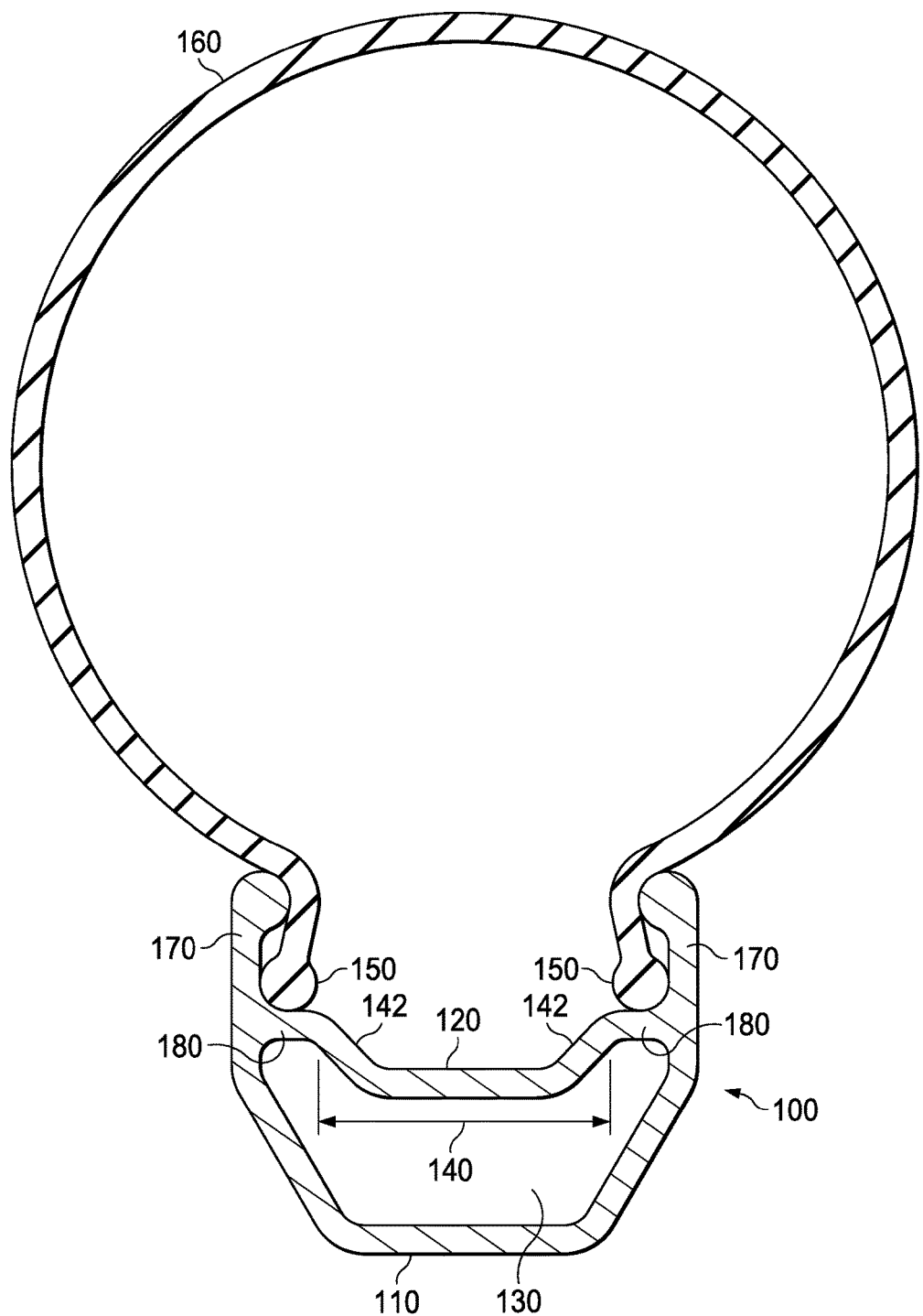

Before discussing certain embodiments as presented herein in more detail, it may be helpful to an understanding of those embodiments to first discuss a conventional tubeless tire setup for bicycles. Turning first then to FIGS. 1A and 1B, a cross section of a conventional rim adapted to mount tires in a tubeless configuration is illustrated. Rim 100 includes an inner wall 110 joined at each end to a tire mounting surface 120 such that a chamber 130 is formed between the tire mounting surface 120 and the inner wall 110. The tire mounting surface 120 includes a center channel 140. When an uninflated tire 160 is placed on the rim 100 the beads 150 of the tire 160 rest in this center channel 140. As the tire 160 is inflated, and a threshold pressure is reached within the tire 160, the tire 160 expands and the beads 150 of the tire 160 travel along the tire mounting surface 120 in a direction away from the centerline (or normal axis) of the rim 100 onto shelf 180 of tire mounting surface 120. The shelf 180, in combination with the sidewalls 170 disposed at the lateral peripheries of the tire mounting surface 120, hold the beads 150 of the tire 160 in place and, as such, seal the system comprised of the rim and the tire.

Conventionally, sidewalls 170 also include a "hook" or projection or lip that curves toward the centerline of the rim to assist in capturing and holding the beads 150 in place. This configuration may present an issue if the tire bottoms out. More specifically, fat bike tires are often run at low pressure which causes the tire to bottom out when the wheel hits an obstruction, lands from a jump, etc. Bottoming out in a configuration such as depicted in FIGS. 1A and 1B places force on the ends of the rim sidewalls 170, resulting in a high moment about the base of the sidewall (e.g., as the sidewalls cantilever relative to their base) and potentially highly localized stress at the bottom corners of the rim sidewalls 170. In rims made of certain material, such as carbon fiber, this can cause cracking.

Rims such as that depicted in FIGS. 1A and 1B may therefore be suitable for skinnier tires where the rim is typically less than 30 mm wide. As discussed above, however, certain bikes, such as fat bikes, may utilize rims and tires of significantly greater width. As such, rims like those depicted in FIGS. 1A and 1B may be unsuitable for these types of applications, among others.

Figure 2:
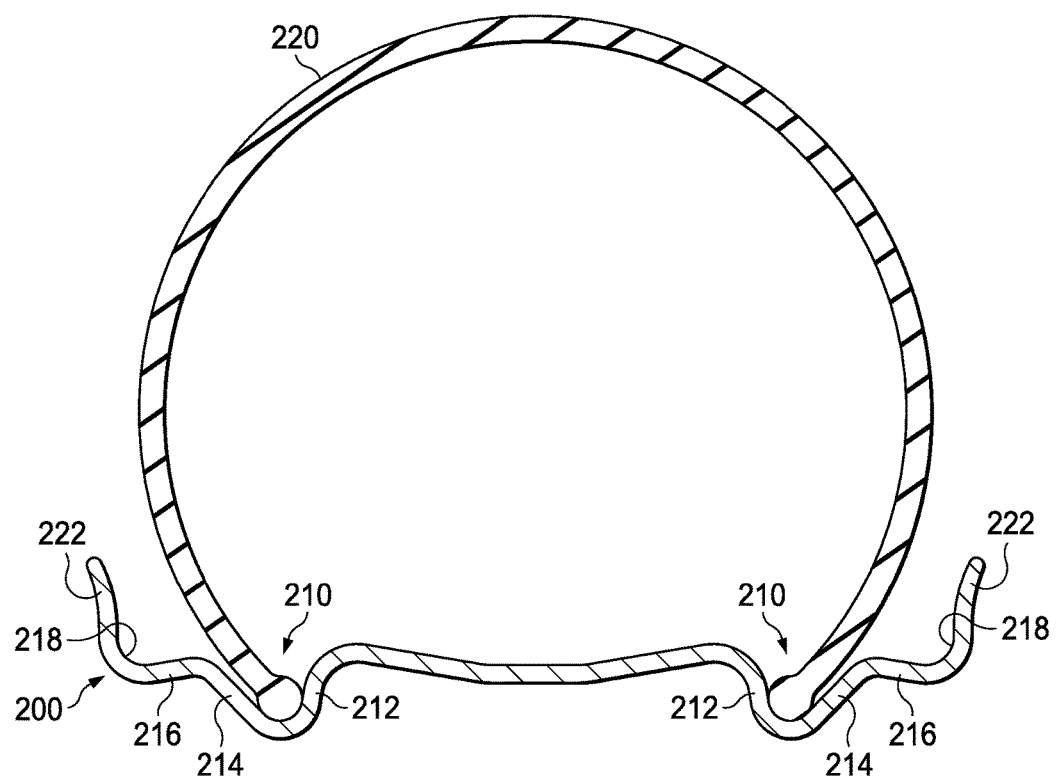
FIG. 2 is a diagrammatic representation of one embodiment of a bicycle rim.

Attention is thus directed to embodiments of bicycle rims presented herein. Among other advantages, embodiments as described herein address the problem of making large sized mountain bike tires and other fat bike tires work in a tubeless configuration. To that end, embodiments of a bicycle rim may include a mounting surface that includes a separate bead channel for each bead of the tire. These bead channels are shaped to allow easy installation of the tire onto the rim without a tube and to control the beads of the tire (e.g., the movement of the beads of the tire) during inflation such that the beads of the tire (or portions thereof) may maintain greater contact with the mounting surface of the rim during the inflation process. Controlling the beads of the tire in this manner allows the beads of the tire to "pop" or move into a bead seat with less air volume, as less air is escaping from the system. Furthermore, embodiments as described allow a rim to be made without any chambers or inner walls, which simplifies construction and manufacturing of the rim, particularly when constructing the rim in carbon fiber FIG. 2 illustrates one embodiment of a rim 200 having spaced tire bead channels 210 that receive the beads of tire 220 prior to inflation. The bead channels 210 may be tapered and formed through the cooperation of an inner sidewall 212 and an outer sidewall 214, with the outer sidewall 214 of the bead channel 210 transitioning to a rim ledge 216. The ledge 216 includes a bead seat portion 218 at the junction of the rim sidewall 222 and the ledge 216.

In one embodiment, the outer sidewalls 214 of bead channels 210 that transition to the ledge 216 may be relatively shallow. Furthermore, according to one embodiment, the inner sidewall 212 of the bead channels 210 may have a higher angle from the rim's axis of rotation (i.e., the radial axis). The ledge 216 may be angled as well. For example the ledge 216 may have a negative angle relative to a reference line parallel to the rim's axis of rotation (e.g., be greater than 90 degrees from the normal axis). Embodiments such as these as will be explained in more detail at a later point herein. The taper of bead channels 210 allows beads of various sizes and shapes to be accommodated and create a seal against outer walls 214.

When a bead travels over a sharp transition between a channel and rim shelf, the bead tends to pop away from the rim allowing air to escape and inhibiting inflation. According to one embodiment then, the rim 200 may also be shaped to avoid or reduce the number of sharp corners at which the bead of a tire can separate from the rim 200 and thus promote contact between the tire bead and rim 200. In such embodiments therefore, the transition from the outer sidewall 214 of the bead channel to the tire shelf 216 may be an outside curve. The radius of these curves may be chosen to ease the formation or manufacture of the rim 200 in a particular material. For example, the radius of these curves may be chosen such that they may be more easily molded or otherwise formed in carbon fiber.

Embodiments of rim 200 advantageously do not require an inwardly projecting lip or hook at the end part of the upper the rim sidewall. As can be seen, rim sidewall 222 may comprise an outside curve that contacts the outside of the tire casing when the tire is in an inflated state. The curvature of sidewall 222 can help retain the tire bead. The sidewall, in this embodiment, thus is not curved back in at the end (the tip of the rim sidewall is angled slightly out). Force from bottoming out will be distributed along the curved sidewall 222 and to a curved transition from the sidewall 222 to the ledge 216. This creates a better distribution of internal stress, thereby reducing the likelihood of cracking in rim 200 (e.g., a rim composed of carbon fiber).

Embodiments such as those depicted may also be a single wall of a uniform or near uniform thickness. A uniform thickness can make the rim easier to produce using certain materials, including carbon fiber. In other embodiments however, the rim may have varying thicknesses in different portions. These varying thicknesses may be helpful to strengthen the rim in certain areas and may be used when the rim is formed of certain metals, such as aluminum. Embodiments may also be optimized for manufacture in carbon fiber or other material. For example, transitions may be curved (e.g., the bottom of bead channels 210 may be an inner curve, the transition from outer wall 214 to ledge 216 may be an outer curve, etc.) with radiuses selected to promote clean molding in carbon fiber.

Figure 3:
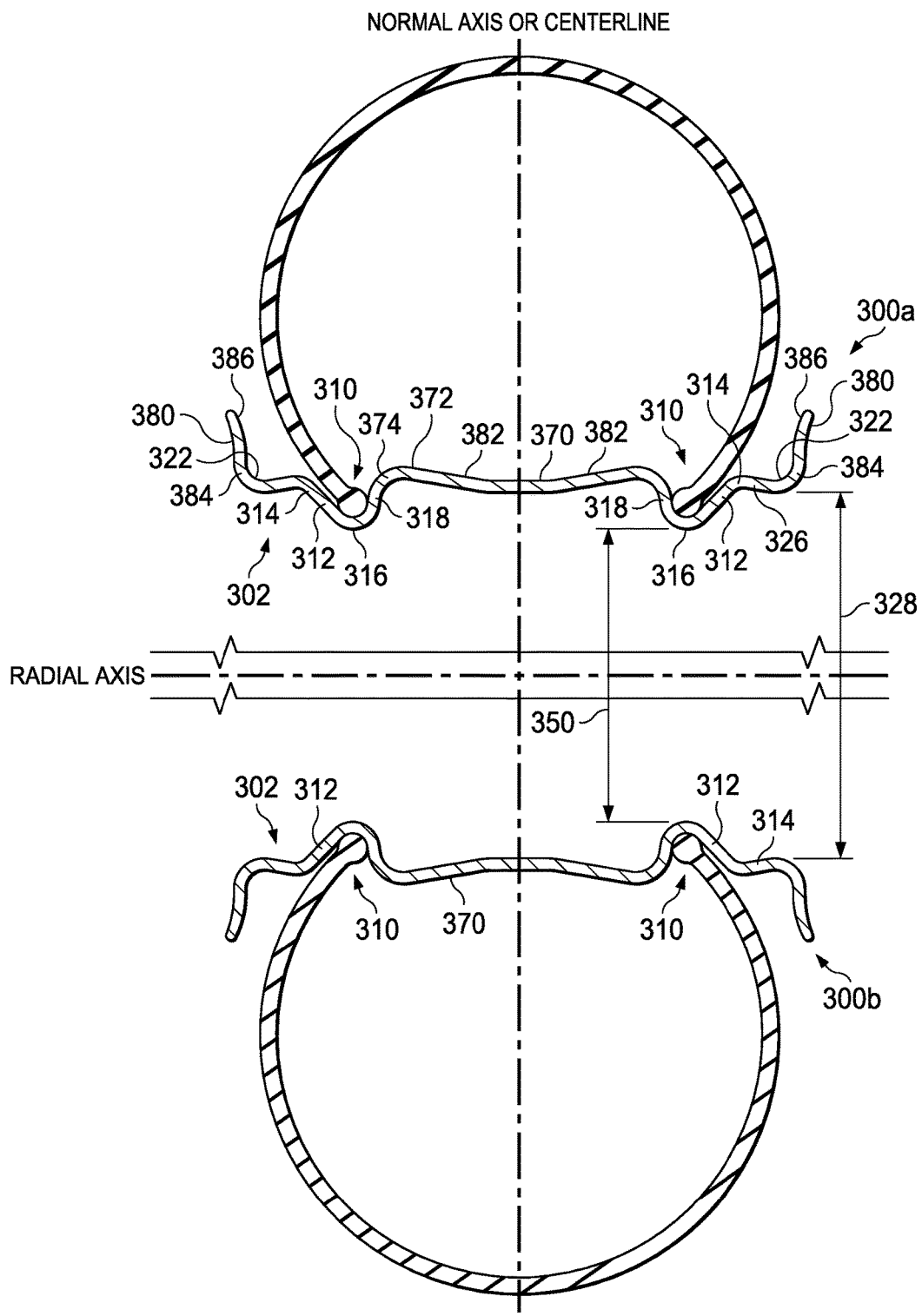
FIG. 3 is a diagrammatic representation of one embodiment of a bicycle rim.

Embodiments may be better explained with reference to FIG. 3 which depicts a cross-sectional view radially opposite portions of a bicycle rim adapted to seat a tire in a tubeless configuration. The rim 300 is comprised of an annular support portion forming a continuous ring about a radial axis. Thus, in FIG. 3, cross sections 300a and 300b are cross sections of rim 300 opposed across the radial axis of rim 300.

The rim 300 may be a single wall having an outer surface (i.e., the surface nearest to a tire when a tire is mounted on rim 300) and inner surface. The single wall can define an annular main mounting or support portion 302 and rim sidewalls 380 that are radially outward at the lateral ends of the support portion 302. Such a rim may come in various widths depending on the width of tire accommodated. Tapered bead channels 310 are disposed across the centerline (i.e., the normal axis) of the support portion 302. Each of the bead channels 310 may be of a diameter configured to accept the bead of a tire in an uninflated state. This bead channel diameter 350 is the distance between radially opposite portions of the same bead channel 310 of rim 300. Each of the bead channels 310 are formed from bead channel outer sidewall 312 and bead channel inner sidewall 318. In some embodiments, bead channel 310 includes a continuous inner curve between bead channel inner sidewall 318 and the bead channel outer sidewall 312. This curve may have a radius of between about 2 and 4 mm on the outer surface of the rim 300 in some embodiments, though other radii may be used.

This outer sidewall 312 may be sloped or curved (collectively referred to using "slope" or "sloped" herein) such that a laterally outward end 314 of the outer sidewall 312 is radially outward of the laterally inward end 316 of the outer sidewall 312. In other words, the laterally outward end 314 of the outer sidewall 312 may be farther from the radial axis of the rim 300 than the laterally inward end 316. In one embodiment, the slope of outer sidewalls 312 may be relatively shallow, for example less than 60 degrees and in some cases less than 45 degrees from a reference line parallel to the rim's radial axis (e.g., greater than 30 degrees from the normal axis). In other embodiments, the outer sidewalls 312 may have a higher angle and in some embodiments may be substantially parallel to the normal axis. For example, in certain embodiments the angle between the outer sidewall 312 and a reference line parallel to the normal axis may be between 35 and 50 degrees.

Rim 300 also includes bead seat portions 322 that are disposed laterally outward of the bead channel 310 and, in particular, may be disposed laterally outward from the laterally outward end 314 of the bead channel 310. Rim ledge 326 extends from the laterally outward end 314 of outer sidewall 312 of bead channel 310 to bead seat portion 322. The transition between the laterally outward end 314 of outer sidewall 312 and rim ledge 326 may be curved outwardly at a radius configured to prevent a gap from forming between the beads of a tire as the bead of the tire moves from the outer sidewall 312 of the rim 300 to the rim ledge 326 during inflation of the tire. For example, the radius of this transition may be between 1 and 3 mm at the outer surface of the rim 300, though other radii may be used.

Each of the bead seat portions 322 may be of a diameter configured to accept the bead of a tire in an inflated state. This bead seat diameter 328 is the distance between radially opposite portions of the same bead seat portion 322 of rim 300. This bead seat diameter 328 may be greater than bead channel diameter 350. For example, for a nominal 29 inch rim, the bead channel diameter 350 may be approximately 551 millimeters while the bead seat portion diameter 328 may be approximately 559 millimeters.

Moreover, rim ledge 326 may have a diameter configured to both increase the effectiveness of bead channel 310 in retaining the bead of an uninflated tire and easing the transition of the bead of the tire into bead seat portion 322 once a threshold pressure is established within the tire. Accordingly, in some embodiments the diameter of the rim ledge 326 may be no greater than the diameter at laterally outward end 314 of bead channel 310.

Specifically, in some embodiments, the laterally outward end 314 of the bead channel outer sidewall 312 may have a (radial) diameter that is greater than the bead seat diameter 328. Thus, in such embodiments, rim ledge 326 may include a surface that slopes substantially continuously from the outward end 314 of bead channel outer sidewall 312 to bead seat portion 322. This slope may be radially inward such that rim ledge 326 may have a substantially decreasing radial diameter from outward end 314 of bead channel outer sidewall 312 to bead seat portion 322. For example, the rim ledge 326 may have a negative angle relatively to the reference line parallel to the rim's radial (e.g., be greater than 90 degrees from the normal axis) and in some embodiments may form an angle between 1 and 10 degrees with the radial axis.

Furthermore, the gradient of the slope may be substantially constant radially inward so that rim ledge 326 is a continuous straight sloped surface from outward end 314 of bead channel outer sidewall 312 to bead seat portion 322. In other words, there may be no raised wall, bump, flange or other protuberance on rim ledge 326; outward end 314 of bead channel 310 is of a greater radial diameter than any portion of rim ledge 326 and no portion of rim ledge 326 is of a greater radial diameter than the diameter of any portion of rim ledge 326 that is laterally inward of that portion. The slope of rim ledge 326 may serve to inhibit the escape or "burping" of air from the tire when lateral forces on the wheel or tire distort the tire.

Bead seat portion 322 may be adjacent to the base 384 of rim sidewall 380 extending radially outward at the lateral ends of the support portion 302. The transition between bead seat portion 322 and rim sidewall 380 may be curved to better maintain a seal between the bead of an inflated tire and the inner surface of the rim 300. This curve may, in some embodiments, have a radius along the outer surface of the rim 300 of approximately 3-5 mm, though other radii may be used. While in some embodiments radially outward end 386 or rim sidewall 380 may "hook" inwardly or have another inward protrusion such that the radially outward end 386 may have at least a portion that is laterally inward of the base 384 of rim sidewall 380, in other embodiments, sidewall 380 may be hookless and the radially outward end 386 of the rim sidewall may be laterally aligned with, or outward of, the base 384.

More particularly, in embodiments where the radially outward end 386 of the rim sidewall 380 is outward of base 384 the sidewall 380 may be outwardly curved from base 384 to radially outward end 386 of the sidewall 380 such that radially outward end 386 is laterally outward of the radially inward base 384 of the sidewall 380. This curve may be radiused such that when the bead of an inflated tire is in bead seat 322 the casing of the inflated tire contacts the sidewall 380 of the rim 300 along at least portion of the curve of the sidewall 380. The contact between the tire casing and the sidewall 380 may serve to better distribute any stress from the tire casing throughout the sidewall 380 and rim 300. By distributing stress in this manner, "burping" of air from the tire when lateral forces on the wheel or tire distort the tire and momentarily unseat the tire's bead from the rim 300 and cracking of the sidewall may be reduced. In some embodiments, this curve may have a radius on the outer surface of around 12-15 mm.

Rim 300 also includes a raised center bridge 370 extending between the bead channel inner sidewalls 318 of the bead channels 310. More specifically, center bridge 370 may be formed between laterally inward ends 374 of the bead channel inner sidewalls 318. The inner sidewall 318 of the bead channels 310 may have a higher angle from the rim's radial axis relative to outer sidewall 312. For example, this angle may be between 60-80 degrees (or between 10 and 30 degrees from the normal axis). In one embodiment, the diameter of the rim at the laterally outward ends 372 of center bridge 370 adjacent to the laterally inward ends 374 of the inner sidewall 318 may be greater than all of the bead channel diameter 350, the bead seat diameter 328 and the diameter of rim ledge 326 at any point of rim ledge 326.

Embodiments of center bridge 370 may allow easier mounting of tire in an uninflated state while simultaneously serving to help control the beads of the tire during inflation. Specifically, as in certain embodiments the center bridge 370 has a diameter at least at its laterally outward ends 372 that is greater than inward ends 374 of the inner sidewall 318, the center bridge 370 may serve to maintain a better seal between the surface of the rim 300 before and during inflation of the tire, as beads of the tire may be better prevented from deflecting toward the centerline of the rim 300 and, as such deflection is better prevented, the beads of the tire are better directed to traveling laterally outward on outer sidewall 312 while maintaining contact with the outer sidewall 312.

In some embodiments, portions 382 of the raised center channel between the laterally outward end 372 of the center bridge 370 and the centerline of the rim 300 may be configured to more easily accommodate the attachment of spokes to the support portion 302 of the rim. For example, portions 382 may slope radially inward from laterally outward end 372 of the center bridge 370 toward the centerline. The angle of this slope may be a spoke angle such that when spokes are attached to the portion 382 of the center bridge 370 the spokes may intersect the portion 382 at an angle close to, or substantially, perpendicular. In certain embodiments, the angle between the portion 382 of the raised center bridge 370 and the radial axis may be between 5 and 20 degrees (e.g., forming an angle of between 85 and 70 degrees with the normal axis).

Figure 4:
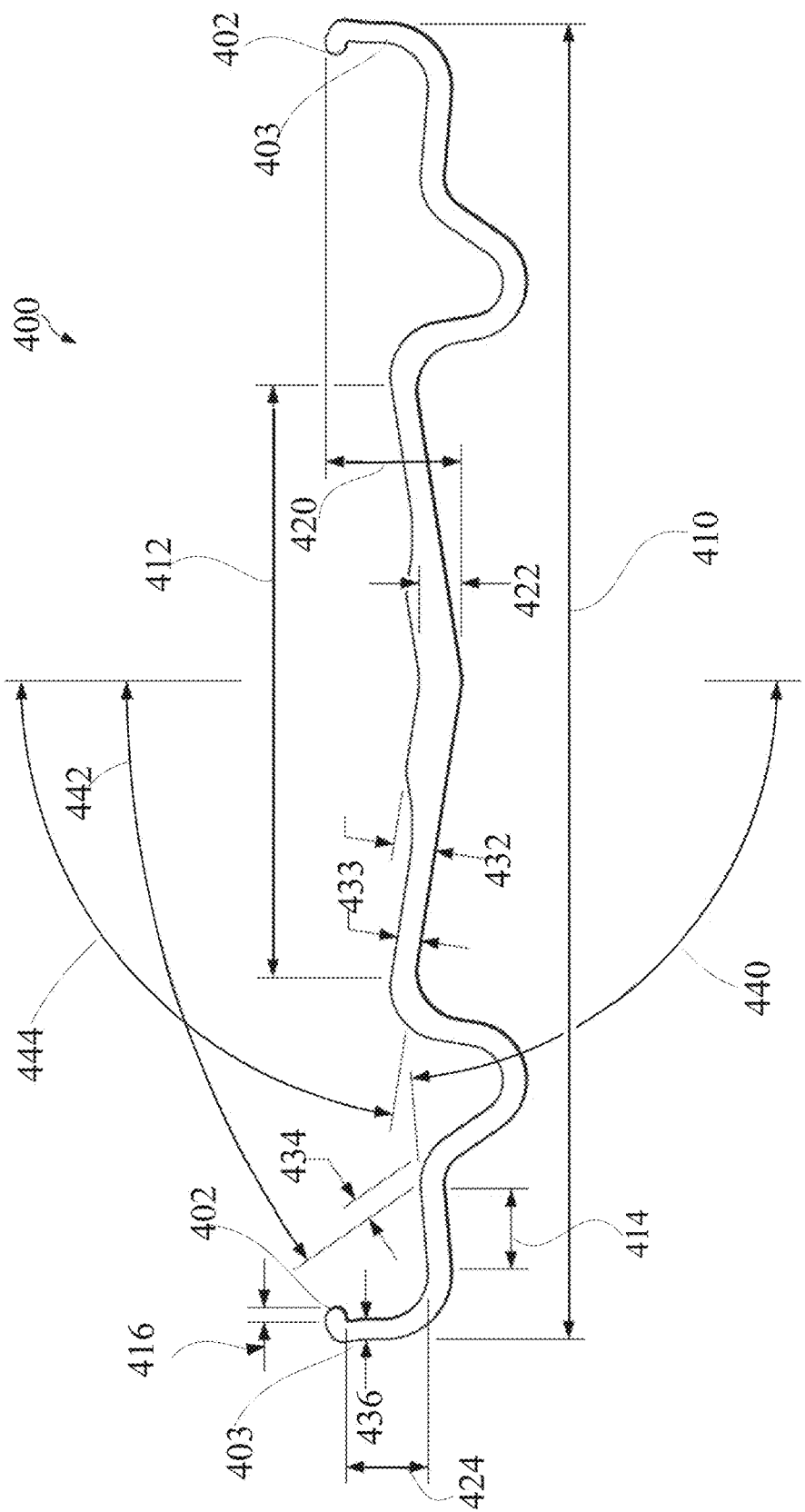
FIG. 4 is a diagrammatic representation of one embodiment of a bicycle rim.

While a specific bead channel shape has been depicted with respect to the embodiments as discussed above with respect to FIG. 3 other bead channel and rim shapes may also be utilized in accordance with embodiments as disclosed herein. For example, FIG. 4 depicts a cross-sectional view of another embodiment of a bicycle rim 400 adapted to seat a tire in a tubeless configuration. Rim 400 includes inward projections 402 at the outer ends of rim sidewalls 403. Rim 400 may be configured to be formed of aluminum. Also provided by way of example are the following example dimensions: width 410 is 80 mm, width 412 is 36 mm, width 414 is 4.9 mm, inward projections 402 project inwardly 85 mm from the inner surface of sidewalls 403 (indicated at 416), height 420 is 8 mm, height 422 is 2.56 mm, height 424 is 5 mm, thickness 430 is 2.56 mm, thickness 432 is 2.5 mm, thicknesses 433, 434 are 1.4 mm, thickness 436 is 1.2 mm, angle 440 is 5 degrees, angle 442 is 35 degrees, angle 444 is 81 degrees. Dimensions provided are provided by way of example and other embodiments may be sized as needed or desired.

Figure 5A:
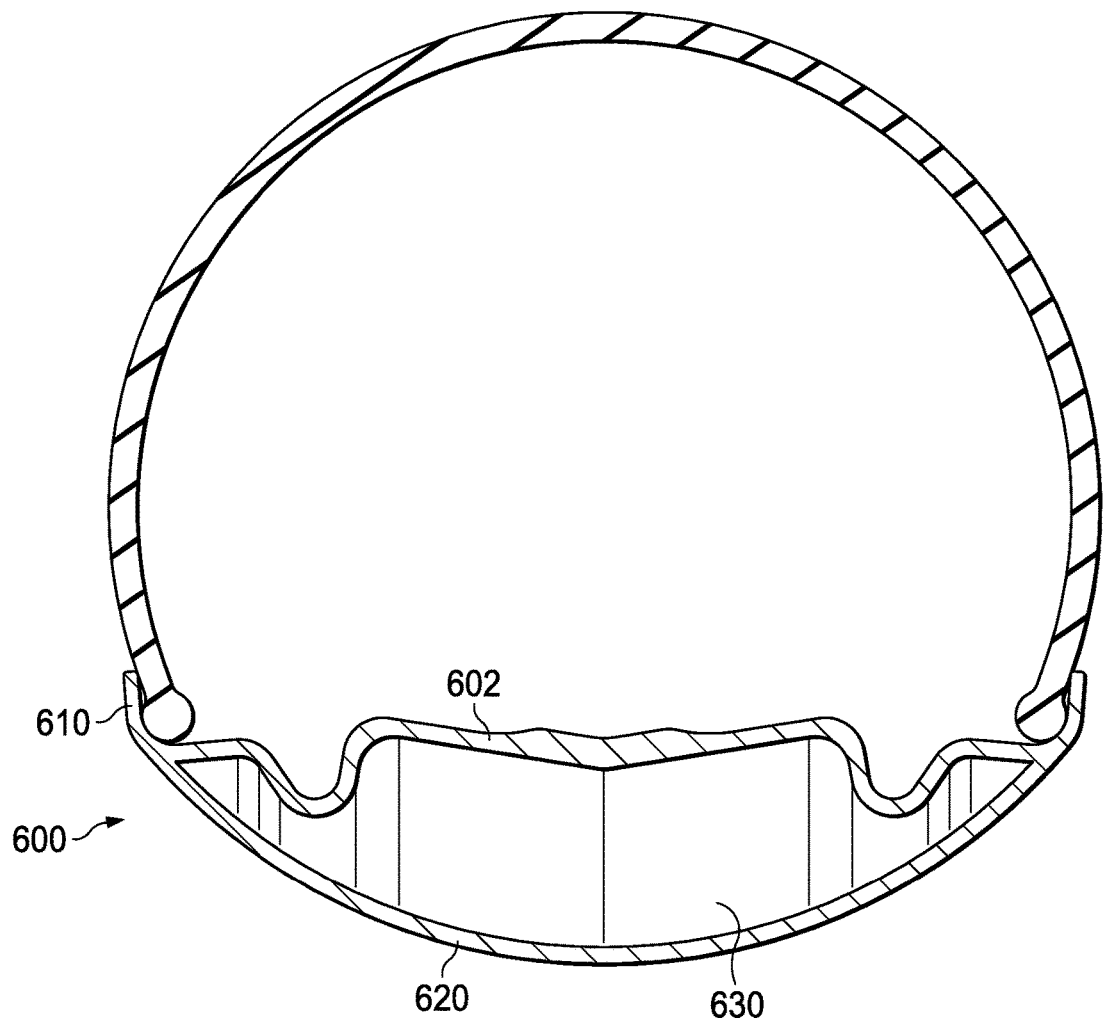
FIG. 5A is a diagrammatic representation of one embodiment of a bicycle rim with a chamber and FIG. 5B is a diagrammatic representation of another embodiment of a rim with a chamber.
Figure 5B:
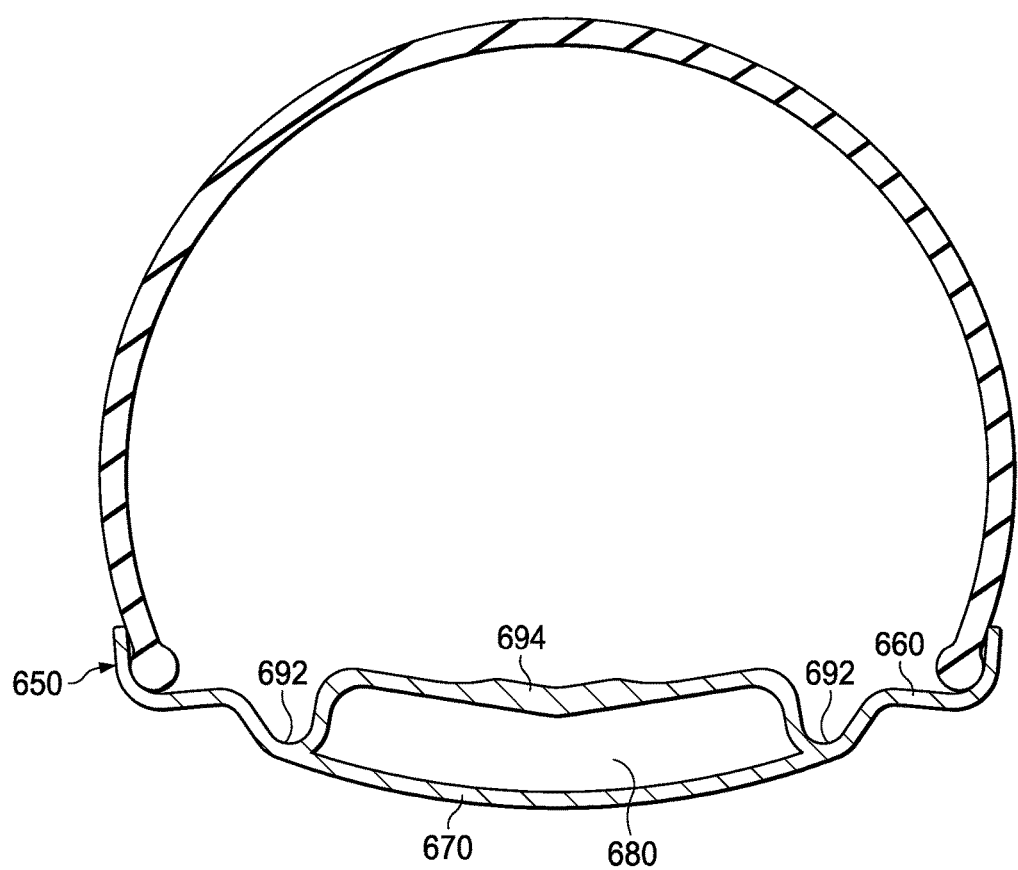

While embodiments as described above are formed of a single wall of material, other embodiments may also include an annular chamber wall that forms a chamber between the center channel of the rim, or the support portion of the rim, and the chamber wall. This chamber wall may, for example, be curved about an axis parallel to the direction of intended rotation of the rim. FIGS. 5A and 5B depict embodiments of a rim with an annular support wall forming a chamber between it and the mounting wall of the rim.

More specifically, FIG. 5A depicts an embodiment of a rim 600 including a mounting wall 610 and an annular chamber wall 620 such that a chamber 630 is formed between mounting wall 610 of the rim 600 and annular chamber wall 620. Mounting wall 610 may be a single wall of material shaped according to embodiments as described above with respect to FIGS. 2-4. Annular chamber wall 620 is a wall formed between the outer surface of distal ends of support portion 602 of mounting wall 610 and curved about an axis parallel to the direction of rotation of rim 600. The radius of the curve of annular chamber wall 620 may be configured such that spokes of a wheel may be more easily and effectively attached and secured through the annular chamber wall 620.

Similarly, FIG. 5B depicts an embodiment of a rim 650 including a mounting wall 660 and an annular chamber wall 670 such that a chamber 680 is formed between mounting wall 660 of the rim 650 and annular chamber wall 670. Mounting wall 660 may be a single wall of material shaped according to embodiments as described above with respect to FIGS. 2-4. Here, annular chamber wall 670 is a wall formed between the outer surface of bead channels 692 of mounting wall 660 and curved about an axis parallel to the direction of rotation of the rim 650. Thus, in this embodiment, the chamber 680 may be substantially between the annular chamber wall 670 and center channel 694 of mounting wall 660. Again, the radius of the curve of annular chamber wall 670 may be configured such that spokes of a wheel may be more easily and effectively attached and secured through the annular chamber wall 670.

As rims shaped according to embodiments as described herein may provide significant advantages, it may be desired to alter others rim shapes such that they are shaped in accordance with the embodiments described herein. In particular, it may be desired to alter conventional shaped tubeless rims similar to those described above with respect to FIGS. 1A and 1B such that the resulting rim is shaped in accordance with embodiments as described. Referring back briefly to FIGS. 1A and 1B for context then, rim 100 includes a center channel 140 that is substantially continuous between channel outer sidewalls 142 disposed on either side of the centerline of the rim 100 at lateral ends of center channel 140. The radial diameter of the rim 100 increases from the beginning of center channel outer sidewalls 142 to beginning of shelf 180 in a direction away from the centerline of the rim 100 such that the bead seat diameter (i.e., the radial diameter of the rim at shelf 180 proximate to sidewalls 170 where beads of the tire are seated in an inflated state) is greater than the center channel diameter.

Accordingly, then, such a rim does not have at least bead channels disposed across a centerline of a rim or a center bridge as may be characteristic of certain embodiments as described herein. It may therefore be desirable to modify rims of this type to include such bead channels and a center bridge. To that end, embodiments may comprise a rim strip including an annular piece of material such as plastic, metal or carbon that is formed separately from the rim and is configured to be attached to a rim (for example, along the centerline of the rim) so that the combination of the rim and the rim strip has a shape that includes bead channels and a raised center bridge as described above with respect to FIGS. 2-4.

Figure 6A:
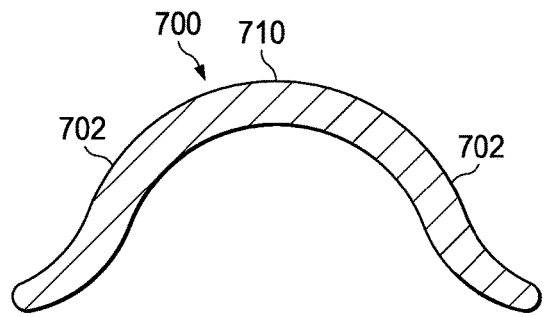
FIG. 6A is a diagrammatic representation of a rim strip.
Figure 6B:
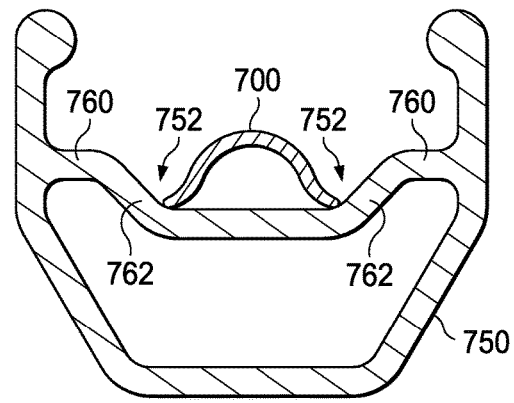
FIG. 6B is a diagrammatic representation of a rim with a rim strip installed.

Turning to FIGS. 6A and 6B one embodiment of such an annular rim strip is depicted. Rim strip 700 is configured to be attached to a rim 750. Rim strip 700 may be attached to rim 750 by, for example, adhering the rim strip 700 to the rim 750 using an adhesive, forming the rim strip so that it may be press fit into the center channel of the rim 750, using a mechanical fastener such as a cable or zip tie generally aligned with the centerline of the rim 750 to hold the rim strip 700 in place, or by another suitable method.

Figure 6C:
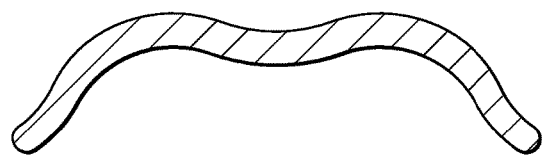
FIG. 6C is a diagrammatic representation of another embodiment of a rim strip and 6D is a diagrammatic representation of another embodiment of a rim strip.
Figure 6D:
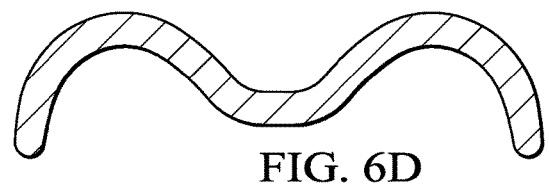

Rim strip includes rim strip sidewalls 702 and a center section 710 extending between the rim strip sidewalls 702. The rim strip sidewalls 702 are spaced at less than a width of the center channel (e.g., between the beginnings of the each channel outer sidewall 762) of the rim 750 into which the rim strip 700 is to be fitted such that when the rim strip 700 is attached to rim 750 two bead channels 752 are formed in cooperation between rim strip (e.g., rim strip sidewalls 702) and the outer sidewalls 762 of the center channels of the rim 750. The center section 710 extending between the rim strip sidewalls 702, when attached, may also have a radial diameter greater than: the bead seat diameter of the rim 750 to which it is attached, the laterally innermost portion of the tire shelf 760 of the rim 750, or all of the tire shelf 760 of the rim 750. It may be realized that as long as bead channels are formed and the radial diameter of the rim strip 700 is as described when the rim strip is attached to a rim, substantially any shape desired may be used for the rim strip 700 itself and that differently shaped rim strips may be used with the same, or differently shaped, rims. For example, FIGS. 6C and 6D depict other shapes of a rim strip that may be formed according to embodiments as described herein. Other shapes for such a rim strip are also contemplated herein.

Thus, whether forming the rim itself into embodiments as described above or by attaching a separately formed rim strip to a conventional rim to produce a rim with a shape as described above, a tire may be more easily mounted and inflated on such a rim. While it should be kept in mind that embodiments of rims as described herein may be used in tubeless configuration or with a tube it may now be helpful to discuss how a tire is mounted on embodiments of such a rim in tubeless manner.

Broadly speaking, according to one embodiment, mounting the tire on embodiments of a rim such as those described above can comprise: 1) inserting the rim inside the tire so that the tire is "outside" of the rim; 2) placing at least a first portion of a first bead of the tire in a bead channel of the rim so that it is captured by the bead channel; 3) placing at least a portion of the second bead of the tire in the other bead channel of the rim so that it is captured by the other bead channel; and 4) now that both tire beads are in the bead channels inflating the tire so that the beads move up onto the tire ledges that hold the tire in place.

Figure 7A:
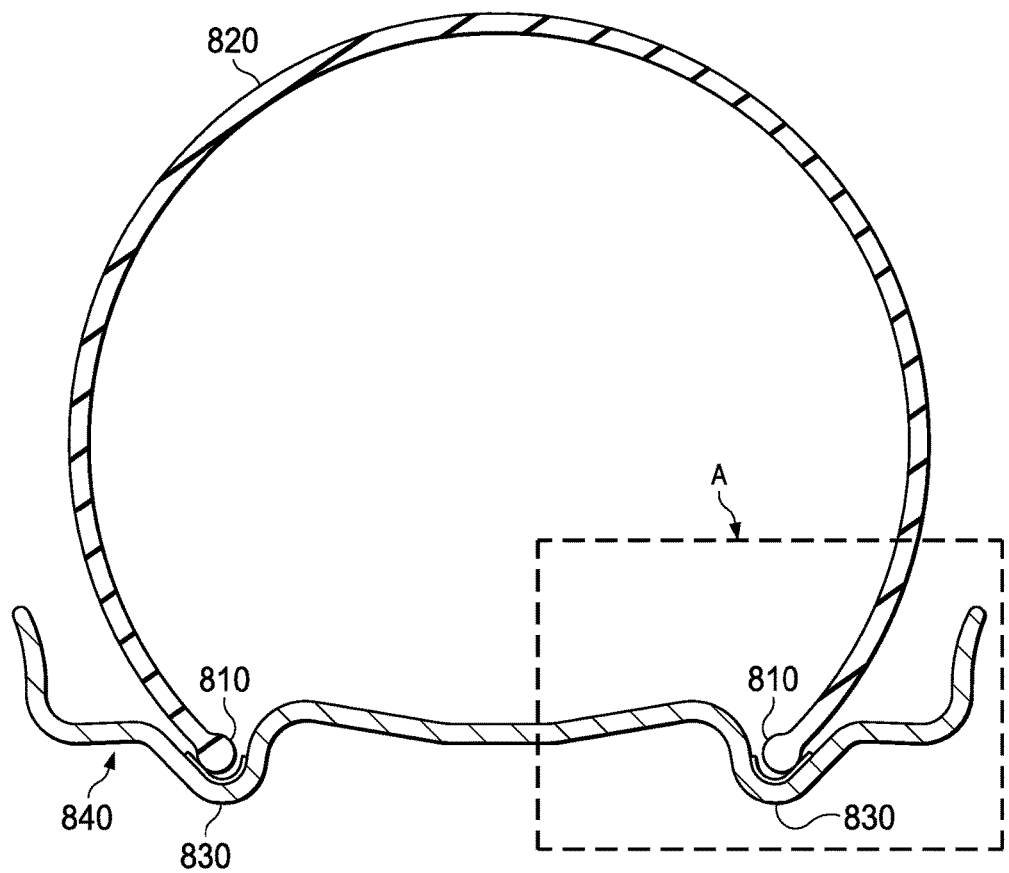
FIG. 7A is a diagrammatic representation of a bicycle rim with a tire in a first state.
Figure 7B:
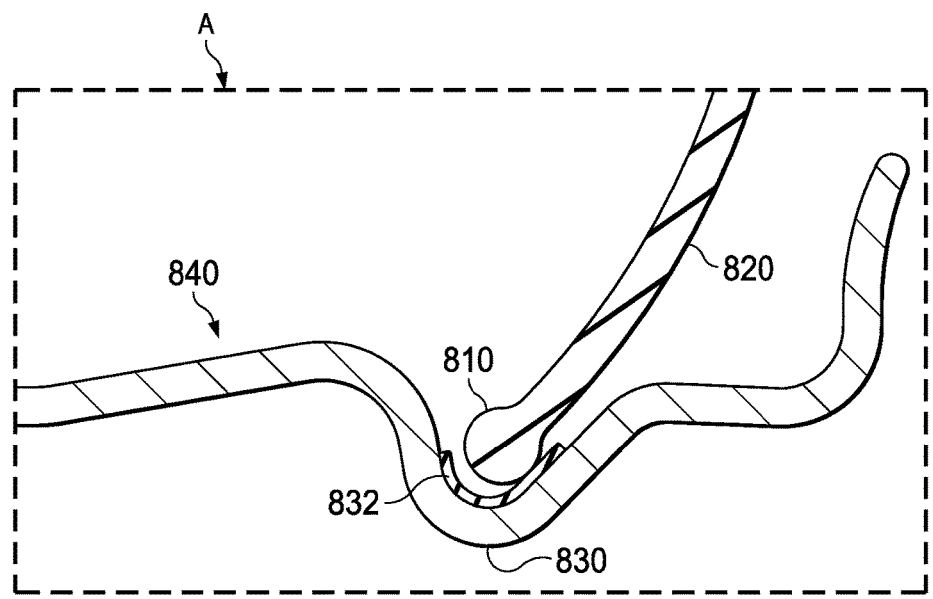
FIG. 7B is a diagrammatic representation of a portion of an embodiment of a bicycle rim and FIG. 7C is a diagrammatic representation of a bicycle rim with a tire in a second state.
Figure 7C:
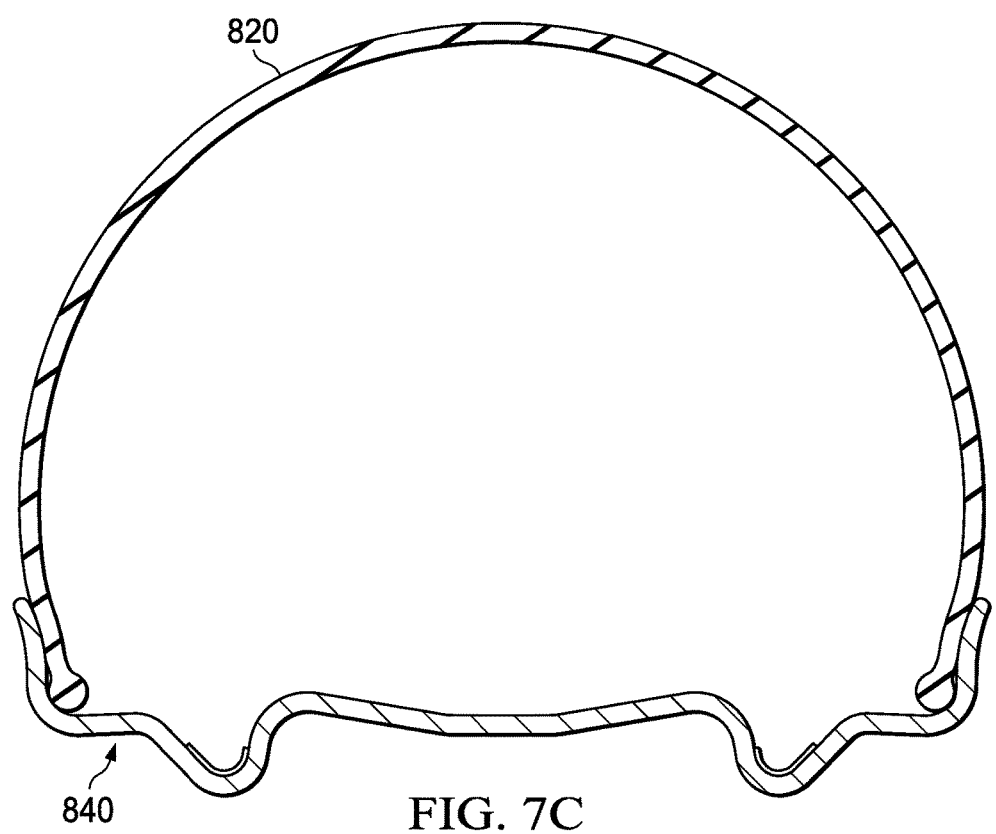

Referring now to FIGS. 7A and 7B, a cutaway partial view and a close-up cutaway partial view (A) of a tubeless tire and rim mounting interface according to one embodiment of a tubeless tire and rim is depicted. FIG. 7C depicts the cutaway view of the rim with the tire after inflation. Initially, the rim 840 may be placed inside the tire 820 without a tube and the beads 810 of the tire 820 may be positioned in bead channels 830 in rim 840 shaped according to embodiments as described above.

To further aid in retaining the tire in the rim and in preventing air loss from the tire around the bead during inflation, embodiments may utilize a mechanical seal between the tire bead and the bead channel. This mechanical seal 832 may be positioned in the bead channel 830 as part of a manufacturing step or provided as part of a separate device that may be later installed. Mechanical seal 832 may be formed from a compressible material including an elastomeric materials such as rubber, latex, silicone or the like. Such a mechanical seal may be a pre-formed gasket, such as an O-ring, band or other gasket. This mechanical seal 832 may be sized to be in tension with the rim or bead channel 830 when installed and may be disposed in one or both channels 830 about a portion of the circumference of the rim 840 or along an entire circumference of the rim 840. This mechanical seal 832 may be positioned in channel 830 before a bead 810 is positioned in the bead channel 830 or after the tire bead 810 is positioned in the bead channel 830.

In one embodiment, a mechanical seal for a rim having between a 26 inch and a 29 inch diameter may include an elastic ring, such as a rubber band, sized with an approximately 17 inch circumference, and having a non-circular cross section with a thickness of approximately 5-7 mm and a height of approximately 1 mm. However, those skilled in the art will appreciate that the size, cross-section shape, material, whether the mechanical seal is installed during manufacturing or afterwards, or whether the mechanical seal is used in both channels or a single channel may vary according to the rim or tire being used or on a variety of other factors.

For example, another type of mechanical seal that may be utilized is rim tape. This rim tape may be, for example, the same rim tape used in preparing the rim 840 for the mounting of the tire. By using rim tape in this manner a good seal between a tire and a rim 840 may be achieved to prevent or avoid air loss, flat tires, damage to a rim caused when a tire is underinflated. Additionally, it may have the advantage of allowing the mounting or dismounting of tires without tools. The rim tape may be applied around the circumference of the rim 840. The application of the rim tape may also serve to seal the spoke nipples in cases where the rim 840 does not include an airtight chamber such as when the rim 840 comprised of a single wall.

It will be apparent that multiple types of mechanical seals may be used in conjunction with one another as well. For example, rim tape may be applied around the circumference of the rim 840 and function as one mechanical seal and an elastomeric band may be placed within a bead channel to function as an additional mechanical seal.

Returning to FIGS. 7A and 7B, regardless of whether a mechanical seal such an elastomeric band or rim tape is utilized, the first step in mounting the tire 820 in the rim 840 is to place or otherwise position a bead 810 of the tire 820 into one of the bead channels 830, which also may be referred to as snapping the bead into the channel. For many tires and rims, this step may be performed without tools. In other embodiments, tools may be used.

At this point, if it is desired to use a separate mechanical seal in the bead channel such as an elastomeric ring, it may be placed into the bead channel. Specifically, the bead 810 may be axially biased inward (e.g., toward the centerline of the rim 840) to expose at least a portion of the bead channel 830. Once the bead channel 830 is exposed, the mechanical seal 832 such as a rubber band, O-ring or other seal may be positioned or applied in the bead channel. As discussed earlier, this mechanical seal will make it more difficult for the tire bead 810 to move in the bead channel 830 and more difficult for air to escape once the tire is inflated. In some embodiments, a mechanical seal 832, when positioned, may be centered in the bead channel 830, does not cover any portion of the tire ledge and may be positioned at least 1 mm below any transition area of the bead channel 830 (e.g., a transition from the outer sidewall of the bead channel to the tire ledge or the inner sidewall of the bead channel to the center bridge). Once the mechanical seal 832 is positioned in the bead channel 830 (or portion of the bead channel), the tire bead 810 (or portion of the tire bead) may be released or biased into the bead channel 830 and further in contact with the mechanical seal.

Once a tire bead 810 is seated in a bead channel 830 (with or without use of a mechanical seal 832), the process of mounting a tubeless tire onto rim 840 may proceed or may include performing similar steps to mount the second tire bead 810 into the second bead channel with or without a mechanical seal 832. Again, the bead, or a portion thereof, may be inserted or otherwise positioned into the bead channel (or a portion of the bead channel). At this point a mechanical seal 832 may be positioned or applied in the channel if desired, substantially as described above.

The portion of the second bead 810 that must be inserted into the second bead channel 830 may vary based on the tire or rim. In some embodiments, 75-80% of the second bead may be inserted into the second channel. As it may be desired to use some form of tire sealant, this tire sealant can be poured into the tire 820 at this point using gap left any portion of the tire bead out of the bead channel (e.g., 20-25%). The wheel may be shaken to distribute tire sealant throughout the tire. The amount of tire sealant needed will vary among different tire/rim combinations, sealant type and other factors. However, those skilled in the art will appreciate that embodiments disclosed herein may ensure a seal such that air loss is prevented or greatly reduced using less (or no) sealant than conventionally shaped rim.

Almost any method, either with or without or a tool may be used to insert a bead 810 (or portion thereof) into a bead channel. For example, to insert a second bead 810 into a bead channel a person may lay the rim on its side (i.e., the side with the other bead already in the other bead channel) and, without stepping on the rim 840, use his feet to snap the second bead past the sidewall of the rim 840. Of course, any other suitable method of inserting the second bead may also be used.

Once the beads 810 (or portions thereof) of the tire are in the bead channels 830 the tire may be inflated in a tubeless manner. In many cases, a person will be able to simply inflate the tire 820 and the tire beads 810 will gradually move onto the rim ledge, such that contact between the bead and the inner surface of the sidewall forms a seal to prevent air loss and any mechanical seal 832 is no longer needed. In fact, in many instances a person may able to inflate a tire in this manner, on embodiments of rims as described, using only a hand pump.

When mounting the tire on such a rim, in certain cases, a bead might resist properly seating on the rim ledge, and in these cases, water or soap or the like may be used to help the tire bead(s) transition from contact with the bead channel (or mechanical seal(s) disposed therein) and onto the rim ledges. In certain scenarios, different tires or rims may still leak air. In these situations, a person may simply bias a bead axially inward to expose the bead channel and any mechanical seal therein, remove any existing mechanical seal and add a mechanical seal or different mechanical seal (i.e., a mechanical seal having a different thickness, shape, size, etc.,) in lieu of the existing mechanical seal or add another mechanical seal in addition to the existing mechanical seal, and repeat the steps of inflating the tire until the leaking has stopped. The mechanical seal(s) may remain unseen in the bead channel(s) until the tire is removed.

Removal may be accomplished by substantially reversing the installation process. Thus, during removal, a person may fully deflate the tire, knock both beads of the tier into their respective channels, remove any mechanical seals found in the bead channels, and then remove the tires, which may be accomplished easily using a tire lever.

Although specific embodiments have been described, these embodiments are merely illustrative, and not restrictive of the invention. The description herein of illustrated embodiments of the invention, including the description in the Exhibits, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention. Any dimensions provided are provided by way of example and other embodiments may be sized as needed or desired.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A bicycle rim adapted to seat a tubeless and tube tires, comprising:
    an annular support portion forming a continuous ring and further comprising:
        a tapered first bead channel having a bead channel diameter disposed to a first side of a centerline of the support portion, further comprising:
            a first bead channel outer sidewall sloped such that a radially outer end of the first bead channel outer sidewall is laterally outward of a radially inner end of the first bead channel outer sidewall;
            a first bead channel inner sidewall;
        a tapered second bead channel having the bead channel diameter disposed to a second side of the centerline, further comprising:
            a second bead channel outer sidewall sloped such that a radially outer end of the second bead channel outer sidewall is laterally outward of a radially inner end of the second bead channel outer sidewall;
            a second bead channel inner sidewall;
        a first bead seat portion and a second bead seat portion, the first bead seat portion disposed laterally outward of the first bead channel from the centerline and the second bead seat portion disposed laterally outward of the second bead channel from the centerline, the first bead seat portion and second bead seat portion having a bead seat diameter that is greater than the bead channel diameter, wherein the support portion has an outer surface that is free of sharp corners between the first bead channel and the first bead seat portion and between the second bead channel and the second bead seat portion;
        a first rim ledge extending from the first bead channel outer sidewall to the first bead seat portion, wherein the first rim ledge comprises a continuous straight outer surface from a transition to the first bead channel outer sidewall to the first bead seat portion that does not increase in diameter from the transition to the first bead channel outer sidewall to the first bead seat portion;
        a second rim ledge extending from the second bead channel outer sidewall to the second bead seat portion, the second rim ledge comprises a continuous straight outer surface from a transition to the second bead channel outer sidewall to the second bead seat portion that does not increase in diameter from the transition to the second bead channel outer sidewall to the second bead seat portion;

a center bridge extending from the first bead channel inner sidewall to the second bead channel inner sidewall, wherein the center bridge has a diameter at a first lateral end and a second lateral end of the center bridge that is greater than the bead channel diameter, bead seat diameter and diameters of the first rim ledge and second rim ledge; and a first rim sidewall and a second rim sidewall disposed across the centerline and extending radially outward from the support portion, the first rim sidewall disposed at a first lateral end of the support portion and the second rim sidewall disposed at a second lateral end of the support portion.

2. The bicycle rim of claim 1, wherein a bottom of the first bead channel comprises a continuous inside curve between the first bead channel inner sidewall and the first bead channel outer sidewall and a bottom of the second bead channel comprises a continuous inside curve between the second bead channel inner sidewall and the second bead channel outer sidewall.

3. The bicycle rim of claim 1, wherein the first rim ledge is sloped radially inward from a transition to the first bead channel outer sidewall to the first bead seat portion and the second rim ledge is sloped radially inward from a transition to the second bead channel outer sidewall to the second bead seat portion.

4. The bicycle rim of claim 1, wherein the center bridge comprises a first portion to the first side of the centerline sloped at a spoke angle and a second portion to the second side of the centerline sloped at the spoke angle.

5. The bicycle rim of claim 1, wherein the first and second rim sidewalls are hookless.

6. The bicycle rim of claim 5, wherein the first and second rim sidewalls curve outward with a curve selected so that a tire casing of an inflated tire contacts the first and second rim sidewalls along an inner side of the curves to distribute stress.

7. The bicycle rim of claim 1, wherein the first and second rim sidewalls curve outward so that radially outward ends of the first and second rim sidewalls are laterally outward of radially inward ends of the first and second rim sidewalls.

8. The bicycle rim of claim 1, wherein a transition between the first bead channel outer sidewall and the first rim ledge and a transition between the second bead channel outer sidewall and second rim ledge are outer curves configured to prevent gapping between a tire bead and the support portion as the tire bead transitions from the first or second bead channel to the first or second rim ledge.

9. The bicycle rim of claim 1, wherein the bicycle rim is formed as a single wall.

10. The bicycle rim of claim 9, wherein:
a bottom of the first bead channel comprises a continuous inside curve between the first bead channel inner sidewall and the first bead channel outer sidewall and a bottom of the second bead channel comprises a continuous inside curve between the second bead channel inner sidewall and the second bead channel outer sidewall;

the first rim ledge is sloped radially inward from a transition to the first bead channel outer sidewall to the first bead seat portion and the second rim ledge is sloped radially inward from a transition to the second bead channel outer sidewall to the second bead seat portion;

a transition between the first bead channel outer sidewall and the first rim ledge and a transition between the second bead channel outer sidewall and the second rim ledge are outer curves configured to prevent gapping between a tire bead and the support portion as the tire bead transitions from the first or second bead channel to the first or second rim ledge;

wherein the first and second rim sidewalls curve outward so that radially outward ends of the first and second rim sidewalls are laterally outward of radially inward ends of the first and second rim sidewalls; and the center bridge comprises a first portion to the first side of the centerline sloped at a spoke angle and a second portion to the second side of the centerline sloped at the spoke angle.

11. A bicycle rim adapted to seat a tubeless and tube tires, comprising:
an annular support portion forming a continuous ring and further comprising:
a tapered first bead channel having a bead channel diameter disposed to a first side of a centerline of the support portion, further comprising:
a first bead channel outer sidewall sloped such that a radially outer end of the first bead channel outer sidewall is laterally outward of a radially inner end of the first bead channel outer sidewall;
a first bead channel inner sidewall, wherein a bottom of the first bead channel comprises a continuous inside curve between the first bead channel inner sidewall and the first bead channel outer sidewall;
a tapered second bead channel having the bead channel diameter disposed to a second side of the centerline, further comprising:
a second bead channel outer sidewall sloped such that a radially outer end of the second bead channel outer sidewall is laterally outward of a radially inner end of the second bead channel outer sidewall;
a second bead channel inner sidewall, wherein a bottom of the second bead channel comprises a continuous inside curve between the second bead channel inner sidewall and the second bead channel outer sidewall;
a first bead seat portion and a second bead seat portion, the first bead seat portion disposed laterally outward of the first bead channel from the centerline and the second bead seat portion disposed laterally outward of the second bead channel from the centerline, the first bead seat portion and second bead seat portion having a bead seat diameter that is greater than the bead channel diameter, wherein the support portion has an outer surface that is free of sharp corners between the first bead channel and the first bead seat portion and between the second bead channel and the second bead seat portion;
a first rim ledge extending from the first bead channel outer sidewall to the first bead seat portion;
a second rim ledge extending from the second bead channel outer sidewall to the second bead seat portion;
a center bridge extending from the first bead channel inner sidewall to the second bead channel inner sidewall, wherein the center bridge has a diameter at a first lateral end and a second lateral end of the center bridge that is greater than the bead channel diameter, bead seat diameter and diameters of the first rim ledge and second rim ledge; and a first rim sidewall and a second rim sidewall disposed across the centerline and extending radially outward from the support portion, the first rim sidewall disposed at a first lateral end of the support portion and the second rim sidewall disposed at a second lateral end of the support portion.

12. The bicycle rim of claim 11, wherein the first rim ledge is sloped radially inward from a transition to the first bead channel outer sidewall to the first bead seat portion and the second rim ledge is sloped radially inward from a transition to the second bead channel outer sidewall to the second bead seat portion.

13. The bicycle rim of claim 12, wherein the first rim ledge comprises a continuous straight sloped outer surface from the transition to the first bead channel outer sidewall to the first bead seat portion and the second rim ledge comprises a continuous straight sloped outer surface from the transition to the second bead channel outer sidewall to the second bead seat portion.

14. The bicycle rim of claim 11, wherein the center bridge comprises a first portion to the first side of the centerline sloped at a spoke angle and a second portion to the second side of the centerline sloped at the spoke angle.

15. The bicycle rim of claim 14, wherein the first and second rim sidewalls are hookless.

16. The bicycle rim of claim 11, wherein the first and second rim sidewalls curve outward so that radially outward ends of the first and second rim sidewalls are laterally outward of radially inward ends of the first and second rim sidewalls.

17. The bicycle rim of claim 16, wherein the first and second rim sidewalls curve outward with a curve selected so that a tire casing of an inflated tire contacts the first and second rim sidewalls along an inner side of the curves to distribute stress.

18. The bicycle rim of claim 11, wherein a transition between the first bead channel outer sidewall and the first rim ledge and a transition between the second bead channel outer sidewall and second rim ledge are outer curves configured to prevent gapping between a tire bead and the support portion as the tire bead transitions from the first or second bead channel to the first or second rim ledge.

19. The bicycle rim of claim 11, wherein the bicycle rim is formed as a single wall.

20. The bicycle rim of claim 19, wherein:
the first rim ledge is sloped radially inward from a transition to the first bead channel outer sidewall to the first bead seat portion and the second rim ledge is sloped radially inward from a transition to the second bead channel outer sidewall to the second bead seat portion;
a transition between the first bead channel outer sidewall and the first rim ledge and a transition between the second bead channel outer sidewall and the second rim ledge are outer curves configured to prevent gapping between a tire bead and the support portion as the tire bead transitions from the first or second bead channel to the first or second rim ledge;
wherein the first and second rim sidewalls curve outward so that radially outward ends of the first and second rim sidewalls are laterally outward of radially inward ends of the first and second rim sidewalls; and the center bridge comprises a first portion to the first side of the centerline sloped at a spoke angle and a second portion to the second side of the centerline sloped at the spoke angle.

21. A bicycle rim adapted to seat a tubeless and tube tires, comprising:
an annular support portion forming a continuous ring and further comprising:
a tapered first bead channel having a bead channel diameter disposed to a first side of a centerline of the support portion, further comprising:
a first bead channel outer sidewall sloped such that a radially outer end of the first bead channel outer sidewall is laterally outward of a radially inner end of the first bead channel outer sidewall;
a first bead channel inner sidewall, wherein a bottom of the first bead channel comprises a continuous inside curve between the first bead channel inner sidewall and the first bead channel outer sidewall;
a tapered second bead channel having the bead channel diameter disposed to a second side of the centerline, further comprising:
a second bead channel outer sidewall sloped such that a radially outer end of the second bead channel outer sidewall is laterally outward of a radially inner end of the second bead channel outer sidewall;
a second bead channel inner sidewall, wherein a bottom of the second bead channel comprises a continuous inside curve between the second bead channel inner sidewall and the second bead channel outer sidewall;
a first bead seat portion and a second bead seat portion, the first bead seat portion disposed laterally outward of the first bead channel from the centerline and the second bead seat portion disposed laterally outward of the second bead channel from the centerline, the first bead seat portion and second bead seat portion having a bead seat diameter that is greater than the bead channel diameter;
a first rim ledge extending from the first bead channel outer sidewall to the first bead seat portion;
a second rim ledge extending from the second bead channel outer sidewall to the second bead seat portion;
a center bridge extending from the first bead channel inner sidewall to the second bead channel inner sidewall, wherein the center bridge has a diameter at a first lateral end and a second lateral end of the center bridge that is greater than the bead channel diameter, bead seat diameter and diameters of the first rim ledge and second rim ledge; and
a first rim sidewall and a second rim sidewall disposed across the centerline and extending radially outward from the support portion, the first rim sidewall disposed at a first lateral end of the support portion and the second rim sidewall disposed at a second lateral end of the support portion.

22. The bicycle rim of claim 21, wherein the first rim ledge is sloped radially inward from a transition to the first bead channel outer sidewall to the first bead seat portion and the second rim ledge is sloped radially inward from a transition to the second bead channel outer sidewall to the second bead seat portion.

23. The bicycle rim of claim 21, wherein a transition between the first bead channel outer sidewall and the first rim ledge and a transition between the second bead channel outer sidewall and second rim ledge are outer curves configured to prevent gapping between a tire bead and the support portion as the tire bead transitions from the first or second bead channel to the first or second rim ledge.

24. The bicycle rim of claim 23, wherein the first and second rim sidewalls are hookless.

25. The bicycle rim of claim 24, wherein the first and second rim sidewalls curve outward with a curve selected so that a tire casing of an inflated tire contacts the first and second rim sidewalls along an inner side of the curves to distribute stress.

26. A bicycle rim adapted to seat a tubeless and tube tires, comprising:
   an annular support portion forming a continuous ring and further comprising:
      a tapered first bead channel having a bead channel diameter disposed to a first side of a centerline of the support portion, further comprising:
         a first bead channel outer sidewall sloped such that a radially outer end of the first bead channel outer sidewall is laterally outward of a radially inner end of the first bead channel outer sidewall;
         a first bead channel inner sidewall;
      a tapered second bead channel having the bead channel diameter disposed to a second side of the centerline, further comprising:
         a second bead channel outer sidewall sloped such that a radially outer end of the second bead channel outer sidewall is laterally outward of a radially inner end of the second bead channel outer sidewall;
         a second bead channel inner sidewall;
      a first bead seat portion and a second bead seat portion, the first bead seat portion disposed laterally outward of the first bead channel from the centerline and the second bead seat portion disposed laterally outward of the second bead channel from the centerline, the first bead seat portion and second bead seat portion having a bead seat diameter that is greater than the bead channel diameter;
      a first rim ledge extending from the first bead channel outer sidewall to the first bead seat portion, wherein the first rim ledge is sloped radially inward from a transition to the first bead channel outer sidewall to the first bead seat portion and comprises a continuous straight sloped outer surface from the transition to the first bead channel outer sidewall to the first bead seat portion;
      a second rim ledge extending from the second bead channel outer sidewall to the second bead seat portion, wherein the second rim ledge is sloped radially inward from a transition to the second bead channel outer sidewall to the second bead seat portion and comprises a continuous straight sloped outer surface from the transition to the second bead channel outer sidewall to the second bead seat portion;
      a center bridge extending from the first bead channel inner sidewall to the second bead channel inner sidewall, wherein the center bridge has a diameter at a first lateral end and a second lateral end of the center bridge that is greater than the bead channel diameter, bead seat diameter and diameters of the first rim ledge and second rim ledge; and
   a first rim sidewall and a second rim sidewall disposed across the centerline and extending radially outward from the support portion, the first rim sidewall disposed at a first lateral end of the support portion and the second rim sidewall disposed at a second lateral end of the support portion.

27. The bicycle rim of claim 26, wherein a transition between the first bead channel outer sidewall and the first rim ledge and a transition between the second bead channel outer sidewall and second rim ledge are outer curves configured to prevent gapping between a tire bead and the support portion as the tire bead transitions from the first or second bead channel to the first or second rim ledge.

28. The bicycle rim of claim 27, wherein the first and second rim sidewalls are hookless.

29. The bicycle rim of claim 26, wherein the first and second rim sidewalls curve outward so that radially outward ends of the first and second rim sidewalls are laterally outward of radially inward ends of the first and second rim sidewalls, wherein the first and second rim sidewalls curve outward with a curve selected so that a tire casing of an inflated tire contacts the first and second rim sidewalls along an inner side of the curves to distribute stress.

* * * * *